United States Patent [19]

Suzuki

[11] Patent Number: 5,150,243
[45] Date of Patent: Sep. 22, 1992

[54] METHOD AND APPARATUS FOR MONITORING AN OPTICAL NETWORK INTERFACE

[75] Inventor: Hiroyuki Suzuki, Kawasaki, Japan

[73] Assignee: Fujitsu Limited, Kawasaki, Japan

[21] Appl. No.: 781,687

[22] Filed: Oct. 24, 1991

Related U.S. Application Data

[63] Continuation of Ser. No. 536,810, Jun. 12, 1990, abandoned.

[30] Foreign Application Priority Data

Jun. 12, 1989 [JP] Japan .................................. 1-148909

[51] Int. Cl.⁵ ........................ H04B 10/08; H04J 14/02
[52] U.S. Cl. .................................... 359/110; 359/114; 359/124; 340/531; 250/551
[58] Field of Search ............... 359/110, 114, 124, 127, 359/143, 152; 340/531, 555; 250/551

[56] References Cited

U.S. PATENT DOCUMENTS 4,850,045  7/1989  Funke ....................................... 370/1
4,994,675  2/1991  Levin et al. ........................ 250/551

FOREIGN PATENT DOCUMENTS 0255137  11/1986  Japan ........................................ 370/1
0294023  11/1988  Japan ........................................ 370/3

Primary Examiner—Edward L. Coles, Sr.
Assistant Examiner—Kinfe-Michael Negash
Attorney, Agent, or Firm—Staas & Halsey

[57] ABSTRACT

A method and apparatus for monitoring an optical network interface. Signals containing information relating to the functional state of an optical network interface are delivered to an operation center. An alarm information transmitting component converts electric alarm information signals generated at the interior of the optical network interface into optical alarm signals. The optical alarm signals are transmitted along an optical fiber to the operation center where an alarm information receiving component derives the alarm information from the optical signal. The alarm information is transmitted to the operation center utilizing an optical alarm signal having a wave length which is different from the wave length of the optical signal used for transmitting the terminal signal. The optical network interface and the remote stations are connected by an optical fiber cable, and the subscriber's terminal and the remote stations are able to transmit a terminal signal in each direction through the optical network interface.

10 Claims, 3 Drawing Sheets

METHOD AND APPARATUS FOR MONITORING AN OPTICAL NETWORK INTERFACE

This application is a continuation of application Ser. No. 07/536,810, filed Jun. 12, 1990, now abandoned.

FIELD OF THE INVENTION

This invention relates to a method and apparatus for monitoring an optical network interface and more particularly, to a method and apparatus for monitoring a functional state of an optical network interface at an operation center.

DESCRIPTION OF THE PRIOR ART

Systems for linking subscribers terminals with a public telephone network utilizing optical fiber cables are presently being considered. In order to form a link in the chain of such a system, it is proposed to link a remote station (RT) in a subscriber's transmission system with an optical network interface (ONI) installed in a subscriber's terminal equipment using optical fiber cable, as shown in FIG. 1, whereby a terminal signal transmitted from the subscriber's terminal (for instance, a telephone set) is sent to the remote station through the optical fiber cable after conversion of the electric signal into an optical signal at the optical network interface.

At the remote station, the optical signal is converted again into an electric signal which is then transmitted to an exchanger through the subscriber's transmission line and a central office terminal (COT) in a public telephone network after multiplexing with terminal signals from other subscriber's terminals. Thus, the originating subscriber's terminal is connected with an intended subscriber's terminal through the exchanger for transferring the terminal signal.

To monitor the operational state of the entire network, information relating to the functional state of the various components is collected at an operation center. Accordingly, the sytem must be arranged so as to send alarm information which originates in the optical network interface to the operation center.

FIG. 2 presents a block diagram of a prior art system, wherein a terminal signal of 64 Kb/s, for example, which originates at a subscriber's terminal, is transmitted to the remote station (RT) through an optical fiber cable 13 after being converted into an optical signal of 1.3 μm having a speed of 1.5 Mb/s, for example, at a service line multiplexer/demultiplexer-electric/optical signal converter 12 contained in the optical network interface (ONI).

The optical signal incident upon the service network multiplexer/demultiplexer-electric/optical signal converter 11 is converted into an electric terminal signal of 64 Kb/s. Then, this terminal signal is sent out to a subscriber's transmission line (DLC line) after multiplexing with terminal signals from other optical network interfaces (ONI) (not shown) and converted into a terminal signal of 1.5 Mb/s.

The multiplexed signal of 1.5 Mb/s fed through the subscriber's transmission line is processed in reverse to the above, and the resultant terminal signal is fed to a respective subscriber's terminal.

As described above, the operation center collects the alarm information relating to the functional state of the parts of the network in order to monitor the operational state of the whole network. However, the system lacks means for notifying the operation center of a fault caused or found at the optical network interface.

If a fault occurs in the transmission of a terminal signal, the functional state of components such as the central office terminal, the subscriber's transmission line, the remote station and the optical fiber cable, where information relating to the functional state is collected by the operation center, may be checked in the first place. If no fault is detected in these components, there is a possibility that the fault occurred in the optical network interface. Accordingly, a maintenance man is compelled to go to a place which is in doubt to check for a fault, and therefore, a considerable amount of time may be expended before the system is restored to a normal condition.

SUMMARY OF THE INVENTION

It is an object of the present invention to provide an improved method and system for monitoring the functional state of the components of an optical network interface using an optical signal for transmitting alarm information, wherein the optical signal has a wave length that is different from that of the optical signals used for transmitting terminal signals in order to form a data link that is independent of the terminal signal transmission link.

To obtain the above-mentioned object, the present invention provides an improved optical network interface monitoring method for monitoring the functional state of the optical network interface at the operation center. Thus, a transmission system for transmitting alarm information from the optical network interface to the operation center includes an alarm information transmitting component for transmitting alarm information generated at the interior of the optical network interface after converting it into an optical signal, and an alarm information receiving component for deriving alarm information from the optical signal received at a remote station. The alarm information is transmitted to the remote station utilizing an optical signal which has a wave length that is different from the wave length of the optical signal used for transmitting a terminal signal, provided that the optical network interface and the remote station are connected by an optical fiber cable. A subscriber's terminal as well as the remote station are capable of transmitting the terminal signal in either direction through the optical network interface.

DESCRIPTION OF THE PREFERRED EMBODIMENT

Figure 1:
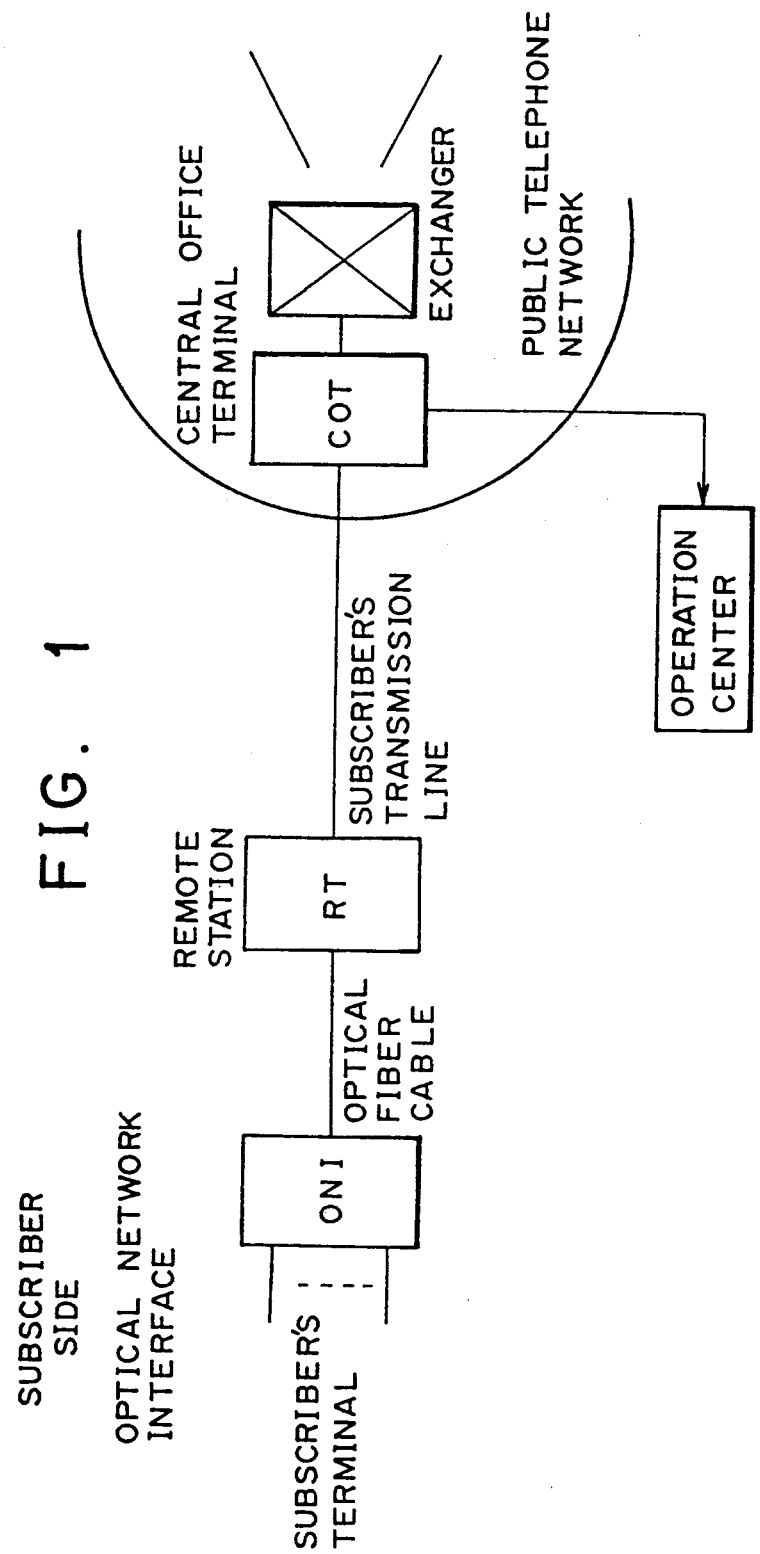
FIG. 1 is a block diagram illustrating a system of the type with which the present invention may be employed.
Figure 2:
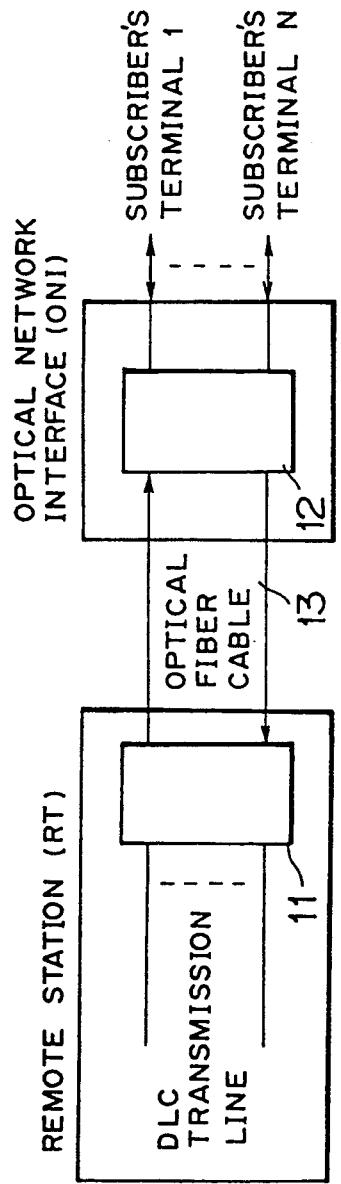
FIG. 2 is a block diagram illustrating a prior art system.

A preferred embodiment of the present invention is described herein below in detail with reference to the accompanying drawings. In the several figures of the drawings, like reference numerals are used to identify like elements.

Figure 3:
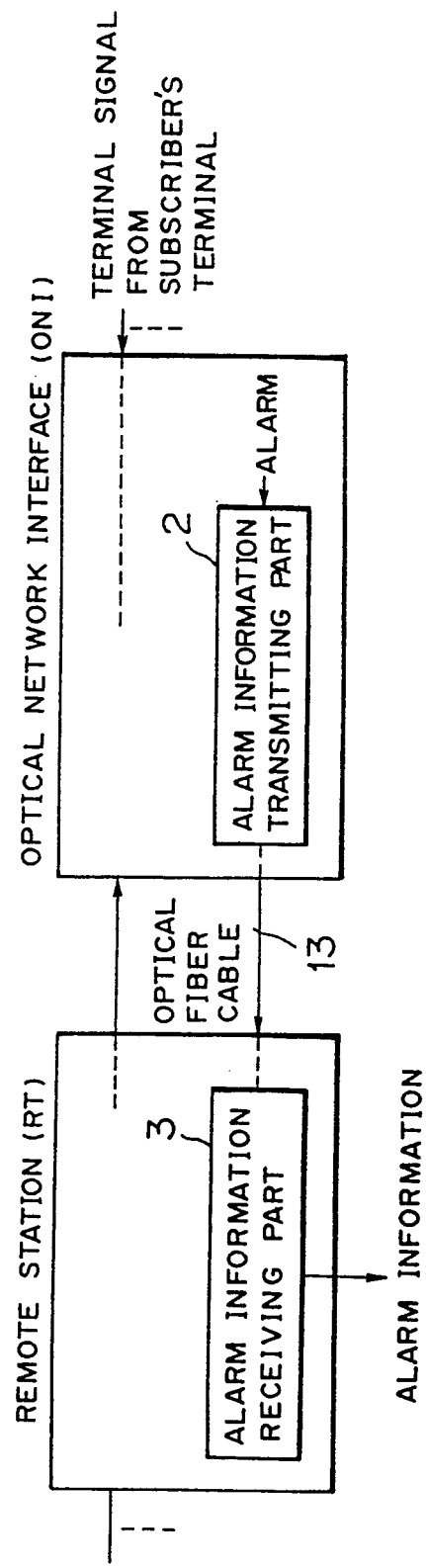
FIG. 3 is a block diagram illustrating the principles of the invention.

The principles of the present invention are shown in FIG. 3, wherein the numeral 2 refers to an alarm information transmitting component for transmitting an alarm signal generated in the optical network interface after converting it into an optical signal, and the numeral 3 refers to an alarm information receiving component for deriving alarm information from the optical signal received at the remote station.

In accordance with the present invention, an alarm information transmitting component is provided in the optical network interface and an alarm information receiving component is provided in the remote station and thus an independent data link is provided between the optical network interface and the remote station for transmitting alarm information using an optical signal having a wave length which is different from the wave length of the optical signal used for transmitting the terminal signal. The alarm information thus transmitted to the remote station is in turn transferred to an operation center through a known transfer means.

Figure 4:
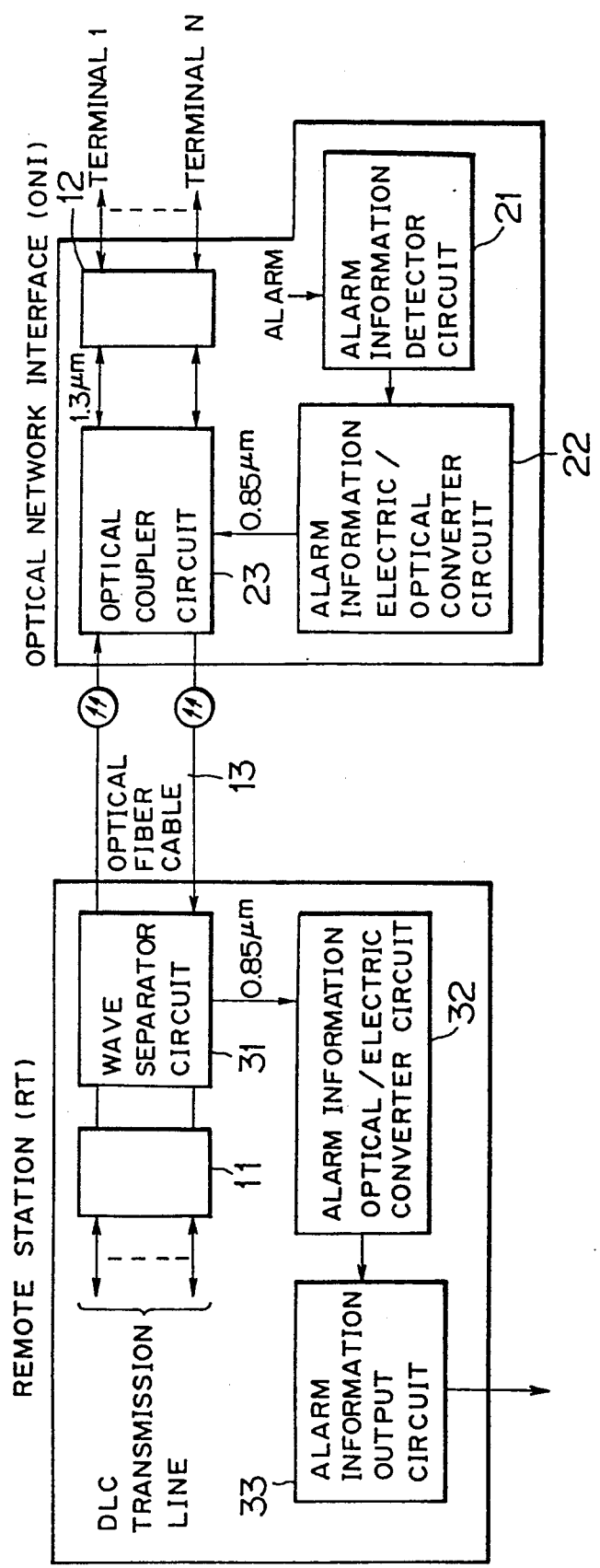
FIG. 4 is a block diagram illustrating an embodiment of the invention.

FIG. 4 is a block diagram illustrating an embodiment of the invention that includes an alarm information detector circuit 21, an alarm information electric/optical converter circuit 22 and an optical coupler circuit 23 as the parts which together form the alarm information transmitting component 2. The embodiment of FIG. 4 also includes a wave separator circuit 31, an alarm information optical/electric converter circuit 32 and an alarm information output circuit 33 as the parts which together form the alarm information receiving component 3. The operation of the embodiment of FIG. 4 will not be described hereinafter in more detail.

Firstly, the alarm information detector circuit 21 of the optical network interface (ONI) checks, in sequence, the functional states at preliminarily selected check points within the optical network interface, and if a fault is detected, alarm information including information as to the position where the fault has occurred is fed to the alarm information electric/optical converter circuit 22.

The alarm information electric/optical converter circuit 22 converts the received alarm information into an optical signal having, for instance, a wave length of 0.85 $\mu$m, a wave length that is different from the wave length of 1.3 $\mu$m used for transmitting a terminal signal. The converted optical signal is then fed to the optical coupler circuit 23.

The optical coupler circuit 23 may include, for example, a filter type optical coupler/separator circuit which transmits an optical signal having a particular wave length while reflecting optical signals having other wave lengths. In addition the optical coupler circuit 23 transmits a combined optical signal to the remote station (RT) through an optical fiber cable 13. The combined signal is formed by admixing the optical signal having the wave length of 1.3 $\mu$m fed by the service line multiplexer/demultiplexer-optical/electric converter circuit 12 and the optical signal having the wave length of 0.85 $\mu$m fed by the alarm information electric/optical converter circuit 22.

The optical signal received at the remote station is separated into the optical signal of 1.3 $\mu$m and the optical signal of 0.85 $\mu$m by means of the wave separator circuit 31 that consists of a filter type wave combiner/separator circuit which is identical to the optical coupler circuit 23. The optical signal of 1.3 $\mu$m converted into an electric terminal signal and multiplexed with other terminal signals at the service line multiplexer/demultiplexer-electric/optical signal converter circuit 11, and the multiplexed signal is then transmitted to subscriber's transmission lines. The optical signal of 0.85 $\mu$m converted into an electric signal at the alarm information optical/electric converter circuit 32 and the electric alarm signal is sent to the alarm information output circuit 33 for processing.

The processed alarm information is then fed to the operation center through known means such as a subscriber's transmission line assigned for monitor-control, and a central office terminal.

Since the transmission of the alarm information between the optical network interface and the remote station is performed utilizing an optical signal having a wave length which is different from that of the optical signal for transmitting service information for various types of services, such as telephone service, data transmission service, video signal transmission service and composite services, no interference will be caused during alarm information collection even if the bit rate for transmitting the service information is changed afterwards. Thus, the monitoring method provided by the present invention can be utilized semi-permanently without being influenced by a change in design of transmission equipment or a change in the services provided to subscribers.

As has been described above, the present invention provides the advantage that alarm information from the optical network interface can be transmitted to the operation center.

In the foregoing specification, the invention has been described with reference to certain specific embodiments; however, it should be evident that various modifications and changes could be made without departing from the scope of the invention as set forth in the appended claims. Accordingly, the specification and the drawing are to be regarded as illustrative rather than restrictive.

I claim:

1. A communications transmission system comprising:

an optical network interface including an optical coupler, for combining a terminal optical signal and an alarm optical signal before transmission, located at an interface thereof;

a remote station including a wave separator circuit, for separating the terminal optical signal and the alarm optical signal, located at an interface of said remote station;

an optical fiber interconnecting said optical network interface and said remote station for transmitting the terminal optical signal and the alarm optical signal, said optical network interface permitting transmission of the terminal optical signal having a predetermined wave length in either direction along said optical fiber between said remote station and a subscriber's terminal;

an alarm information transmitting component of said optical network interface, operatively connected to said optical coupler, for converting alarm information generated as a result of a fault within said optical network interface into the alarm optical signal having a wave length which is different than said predetermined wave length, and delivering the alarm optical signal to said optical fiber, said optical fiber transmitting the alarm optical signal received from said alarm information transmitting component to said remote station; and an alarm information receiving component, operatively connected to said wave separator circuit, for processing the alarm optical signal transmitted by said optical fiber to derive alarm information therefrom.

2. A communication transmission system as set forth in claim 1, wherein said alarm information transmitting component includes an alarm information detecting circuit and an alarm information electric/optical converter circuit.

3. A communication transmission system as set forth in claim 1, wherein said alarm information receiving component includes an alarm information optical/electric converter circuit and an alarm information output circuit.

4. A communication transmission system as set forth in claim 1, wherein said terminal optical signal has a wave length of 1.3 μm and said alarm optical signal has a wave length of 0.85 μm.

5. A method for operating a communications transmission system that comprises an optical network interface, a remote station and an optical fiber interconnecting the interface and the remote station, said method comprising the steps of:
   (a) transmitting a terminal optical signal having a predetermined wave length in either direction along the optical fiber between the remote station and the optical network interface;
   (b) converting alarm information generated as a result of a fault within the optical network interface into an alarm optical signal having a wave length which is different than the predetermined wave length;
   (c) transmitting the alarm optical signal to the optical fiber for transmission therealong to the remote station; and
   (d) processing the alarm optical signal received at the remote station to derive alarm information therefrom.

6. A method as set forth in claim 5, wherein said alarm information is generated at said interface as an electric signal and said conversion comprises converting the electric signal to an optical signal.

7. A method as set forth in claim 5, wherein said processing of the alarm optical signal at the remote station includes the step of converting the optical signal to an electric signal.

8. A method as set forth in claim 5, wherein said terminal optical signal has a wave length of 1.3 μm and said alarm optical signal has a wave length of 0.85 μm.

9. A method for operating a communications transmission system that comprises an optical network interface, a remote station and an optical fiber interconnecting the interface and the remote station, said method comprising the steps of:
   (a) combining a terminal optical signal, having a predetermined wavelength in either direction along the optical fiber between the remote station and the optical network interface, and an alarm optical signal, having a wavelength different from that of the predetermined wavelength, before transmitting the optical signal and alarm optical signal along the optical fiber;
   (b) outputting the alarm optical signal to the optical fiber for transmission therealong to the remote station; and
   (c) processing the alarm optical signal received at the remote station to derive alarm information therefrom.

10. A method as set forth in claim 9, wherein said combined signals are separated at said remote station.

* * * * *